(12) United States Patent
Mery et al.

(10) Patent No.: US 10,272,503 B2
(45) Date of Patent: Apr. 30, 2019

(54) TOOLING FOR MACHINING A GROOVE OF A TURBINE ENGINE CASING

(71) Applicant: Safran Aircraft Engines, Paris (FR)

(72) Inventors: Laureline Mery, Moissy-Cramayel (FR); Kévin Coue, Moissy-Cramayel (FR); Adrien Paixao, Moissy-Cramayel (FR)

(73) Assignee: Safran Aircraft Engines, Paris (FR)

( * ) Notice: Subject to any disclaimer, the term of this patent is extended or adjusted under 35 U.S.C. 154(b) by 29 days.

(21) Appl. No.: 15/558,420

(22) PCT Filed: Mar. 14, 2016

(86) PCT No.: PCT/FR2016/050560
§ 371 (c)(1),
(2) Date: Sep. 14, 2017

(87) PCT Pub. No.: WO2016/146926
PCT Pub. Date: Sep. 22, 2016

(65) Prior Publication Data
US 2018/0056406 A1    Mar. 1, 2018

(30) Foreign Application Priority Data

Mar. 18, 2015 (FR) ...................... 15 52226

(51) Int. Cl.
*B23C 3/34* (2006.01)
*F01D 25/28* (2006.01)

(52) U.S. Cl.
CPC .............. *B23C 3/34* (2013.01); *F01D 25/285* (2013.01); *B23C 2215/04* (2013.01); *B23C 2220/36* (2013.01); *F05D 2230/10* (2013.01)

(58) Field of Classification Search
CPC ... B23C 3/34; B23C 2215/04; B23C 2220/36; B23C 2220/08; B23C 2220/366; F01D 25/285; F05D 2230/10
See application file for complete search history.

(56) References Cited

U.S. PATENT DOCUMENTS

| | | |
|---|---|---|
| 4,050,335 A | 9/1977 | Gilmore |
| 2011/0083537 A1 | 4/2011 | Place et al. |

FOREIGN PATENT DOCUMENTS

| | | |
|---|---|---|
| DE | 195 25 310 A1 | 12/1995 |
| EP | 1 129 813 A1 | 9/2001 |
| FR | 2 925 120 | 6/2009 |

*Primary Examiner* — Alan Snyder
(74) *Attorney, Agent, or Firm* — Blank Rome LLP

(57) ABSTRACT

The invention relates to tooling (24) for machining an annular groove of a turbine engine casing, wherein said tooling (24) comprises a machining tool (25), a baseplate (33), first means of positioning (28) the machining tool (25) in relation to the baseplate (33) along a first axis (Y) forming a radial axis, second means of positioning (30) the machining tool (25) in relation to the baseplate (33) along a second axis (X) perpendicular to the first axis (Y), wherein said second axis (X) extends along the axis of the groove and of the annular casing and third means of positioning capable of positioning the baseplate (33) axially and radially in relation to the groove of the casing.

12 Claims, 5 Drawing Sheets

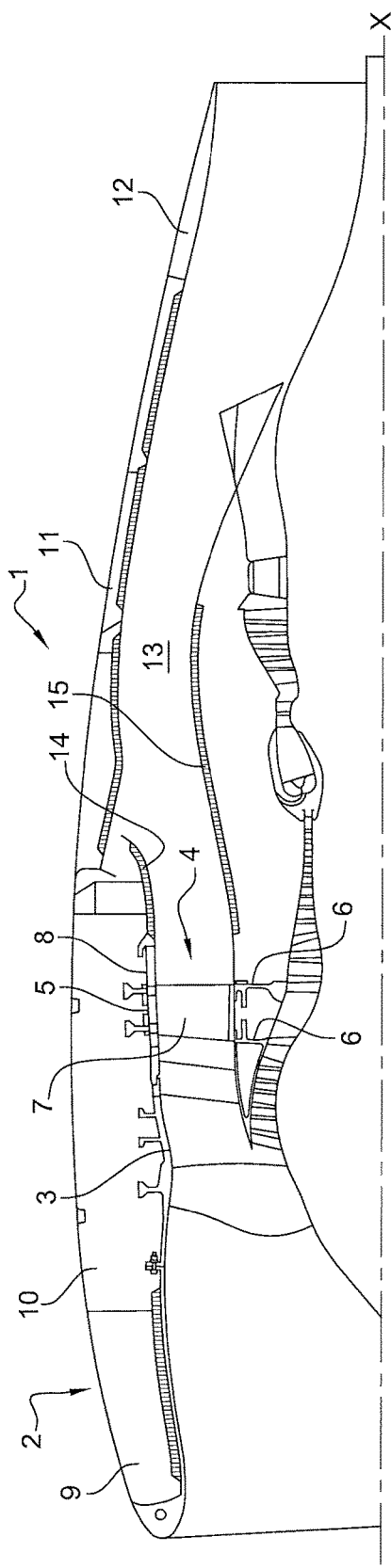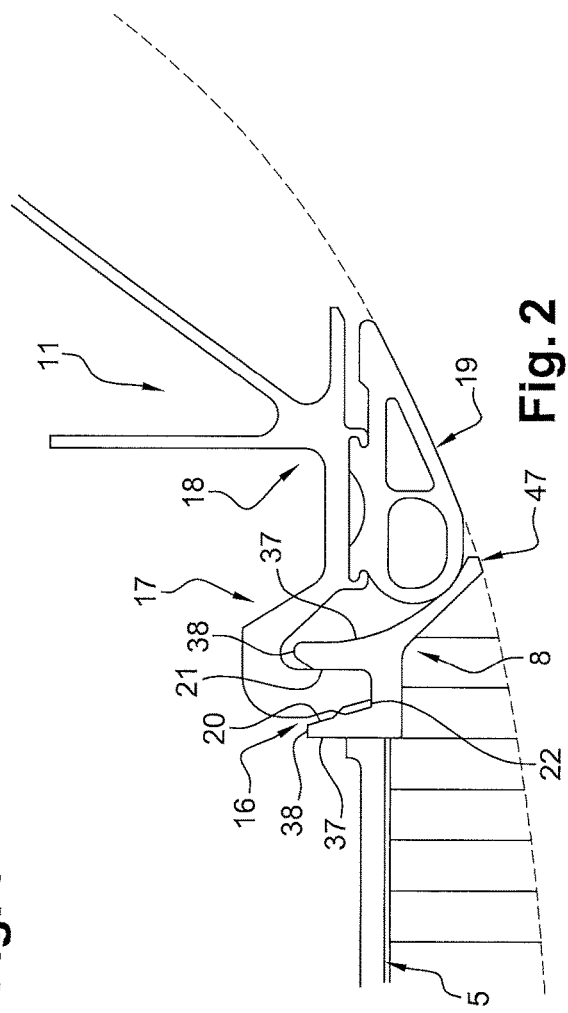

TOOLING FOR MACHINING A GROOVE OF A TURBINE ENGINE CASING

Figure 3:
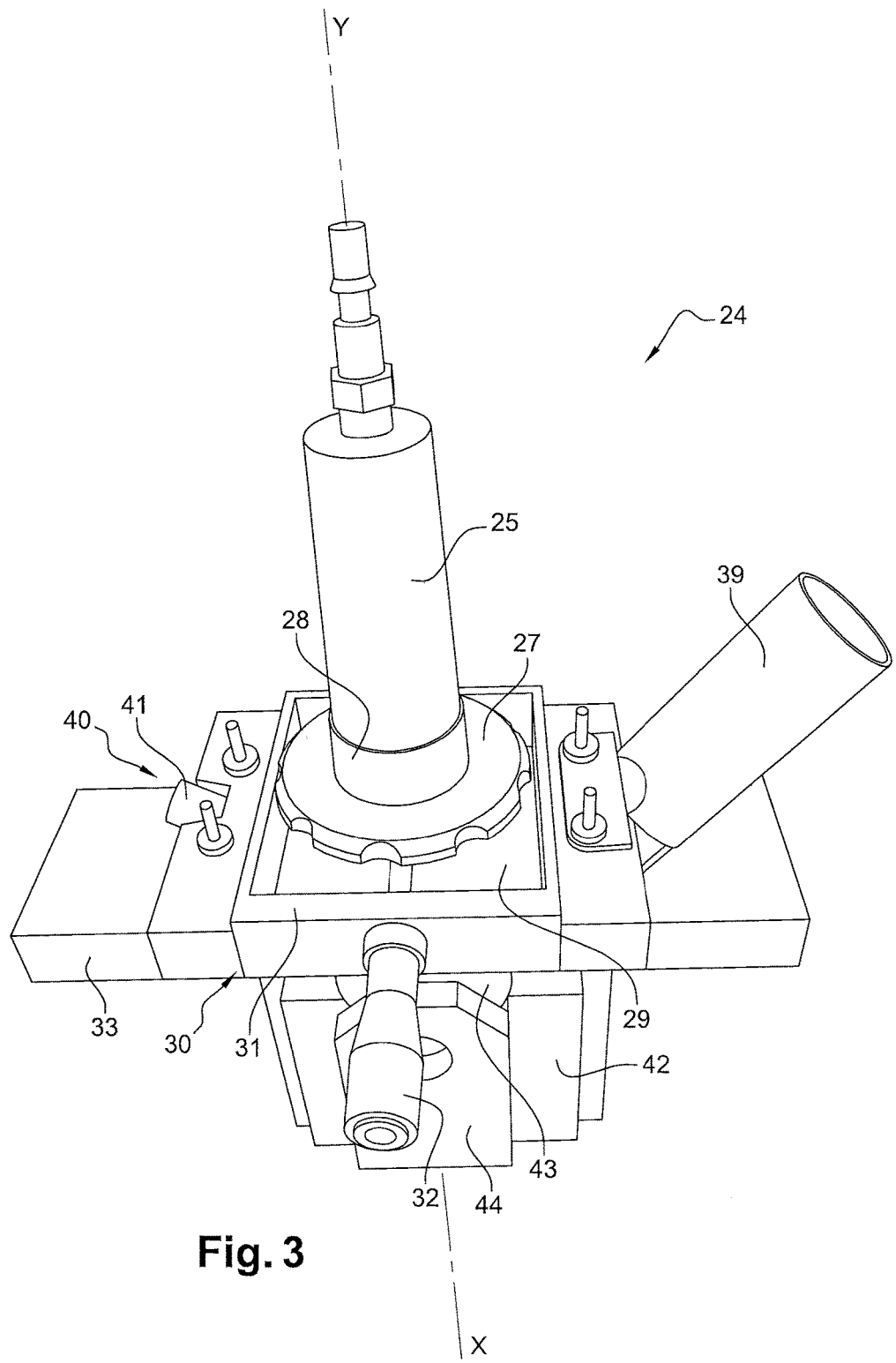

This application is a national phase of PCT/FR2016/050560, filed on Mar. 14, 2016 which claims priority to FR1552226 filed Mar. 18, 2015. The content of those applications are hereby incorporated by reference.

The invention relates to tooling for machining an annular groove of a turbine engine casing in addition to a method of machining such a groove.

A turbine engine conventionally comprises an intermediate casing containing a shroud, known as an intermediate casing shroud, designed to create an interface between the intermediate casing of the turbine engine and the thrust reverser cowls of the nacelle.

An example of an intermediate casing shroud is described for example in document FR 2 925 120.

The intermediate casing shroud comprises an annular groove that is designed to receive an additional annular lip forming part of the thrust reverser cowls. The lip rests radially and/or axially against the inner faces of the groove.

During operation of the turbojet engine, the direction and amplitude of the bearing forces vary according to the operating conditions of the turbojet engine.

Thus, for example, when the turbojet engine is stationary, the shroud supports the thrust reverser cowl and the lip therefore rests radially downwards against the bottom of the groove.

Conversely, during thrust reversal, the lip rests axially in one direction against a wall of the groove and radially against the bottom of the groove.

Also, the turbojet engine produces vibrations that result in relative motion between the lip and the groove.

All these stresses and vibrations cause wear of the walls of the groove. This wear is distributed irregularly over the periphery of the groove.

When this wear exceeds a predetermined limit, on the order of a few tenths of a millimetre, the groove needs to be repaired. Failing an existing repair method, the shroud is replaced, which requires complete dismantling of the engine, with an operation of this kind being long and costly.

The invention proposes tooling allowing machining of the worn areas with a view to their repair, directly under the wing of an aircraft, i.e. without dismantling the engine.

For this purpose, the invention relates to tooling for machining an annular groove of a turbine engine casing, wherein said tooling comprises a machining tool, a baseplate, first means of positioning the machining tool in relation to the baseplate along a first axis forming a radial axis, second means of positioning the machining tool in relation to the baseplate along a second axis perpendicular to the first axis, wherein said second axis extends along the axis of the groove and of the annular casing and third means of positioning capable of positioning the baseplate axially and radially in relation to the groove of the casing.

Tooling of this kind allows precise positioning of the machining tool in relation to the groove, via the various means of positioning, subsequently allowing precise machining of each worn area, without any need to dismantle the engine. Said machining can thus be performed area by area under the wing of an aircraft. Complete dismantling of the engine is avoided in this manner, in addition to complete replacement of the intermediate casing shroud. After machining the various worn areas, an anti-wear strip for example can subsequently be affixed to each machined area, with an anti-wear strip of this kind being produced based on resin and comprising fibres. Another solution involves for example applying a layer of resin in addition to a solution for lubricating the repaired area.

Preferably, the first means of positioning comprise a micrometric ring capable of adapting the position of the machining tool along the first axis, by rotating the ring. A ring of this kind allows precise radial positioning of the machining tool in relation to the groove.

Furthermore, the second means of positioning comprise a micrometric table comprising a support that is mobile along the second axis in relation to the baseplate, wherein the machining tool is mounted on the mobile support. Use of the micrometric table allows precise axial positioning of the machining tool in relation to the groove.

In this case, the machining tool can be mounted on the mobile support via the first means of positioning.

Furthermore, the third means of positioning may comprise at least one bearing area of the baseplate, capable of being engaged and/or resting radially and axially in a form-fitting manner on annular sides, for example radial sides, delimiting the groove of the turbine engine casing.

According to a characteristic of the invention, the machining tool may be a milling tool.

The first means of positioning may be capable of positioning the machining tool radially in relation to the baseplate with a tolerance of less than 0.05 mm, preferably less than 0.025 mm, wherein the second means of positioning may be capable of positioning the machining tool axially in relation to the baseplate with a tolerance of less than 0.1 mm, preferably less than 0.05 mm.

Furthermore, the tooling may comprise pressure means capable of holding the baseplate against the casing. A characteristic of this kind maintains the correct position of the baseplate and therefore of the machining tool, in relation to the groove.

In this case, the pressure means may comprise at least one roller and elastic return means intending to hold said roller on the casing, opposite said groove and the baseplate.

The invention also comprises a process for machining an annular groove of a turbine engine casing, for example of a turbine engine intermediate casing, comprising the steps involving:

identifying a worn area of said groove,
  installing tooling according to the invention on said casing such that the baseplate is mounted on said groove via third means of positioning, at the level of said worn area,
  machining at least part of said worn area of the groove by moving the tooling along said worn area.

The invention thus proposes a simple machining method allowing machining of only the worn areas of the groove, without dismantling the engine and directly under the aircraft wing.

Preferably, the step of installing the tooling on the casing comprises a step of radial and axial positioning of the machining tool in relation to said groove, using the first, second and third means of positioning.

Said positioning step may comprise a step of determining the difference in size between the worn area and the sound area of the groove.

Figure 4:
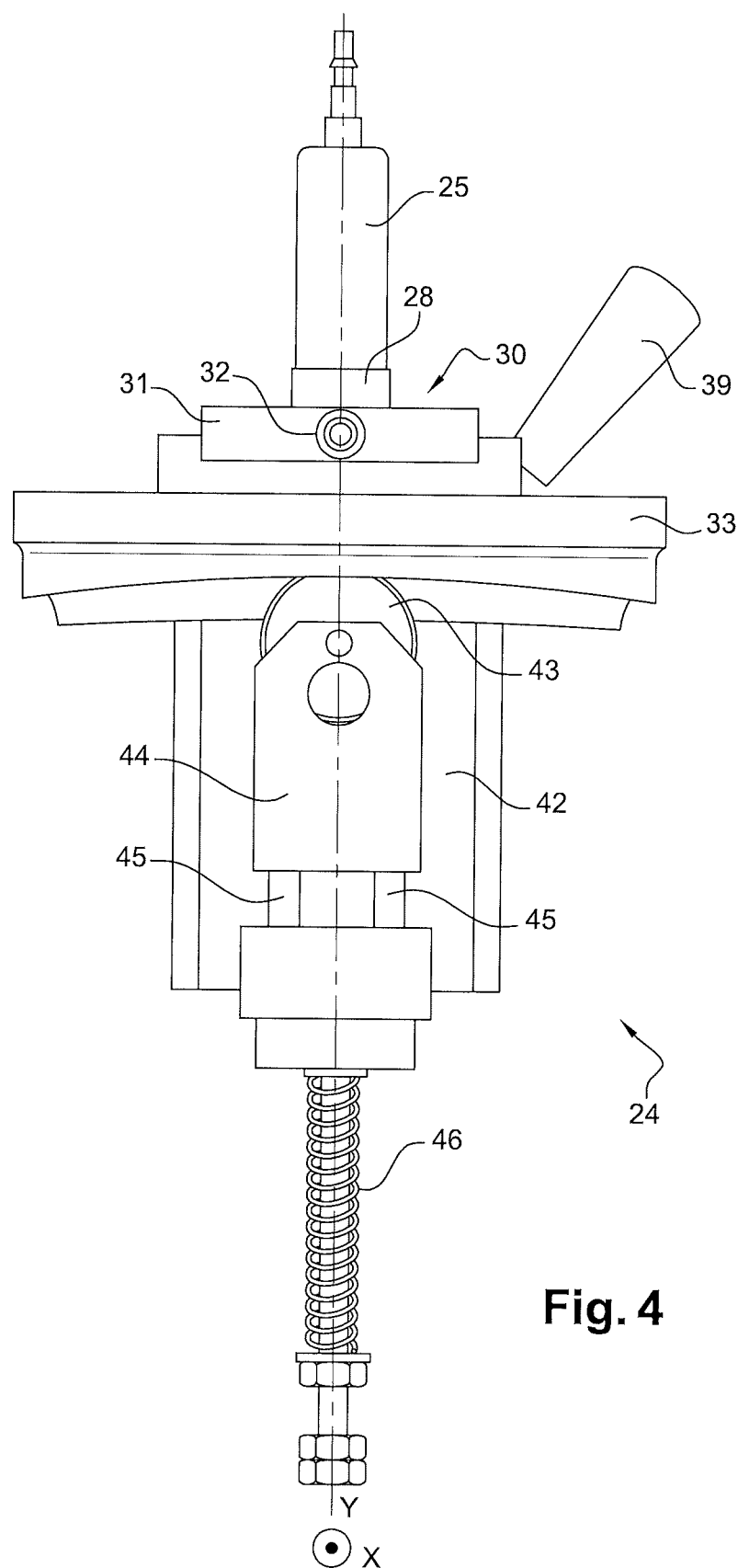
Figure 5:
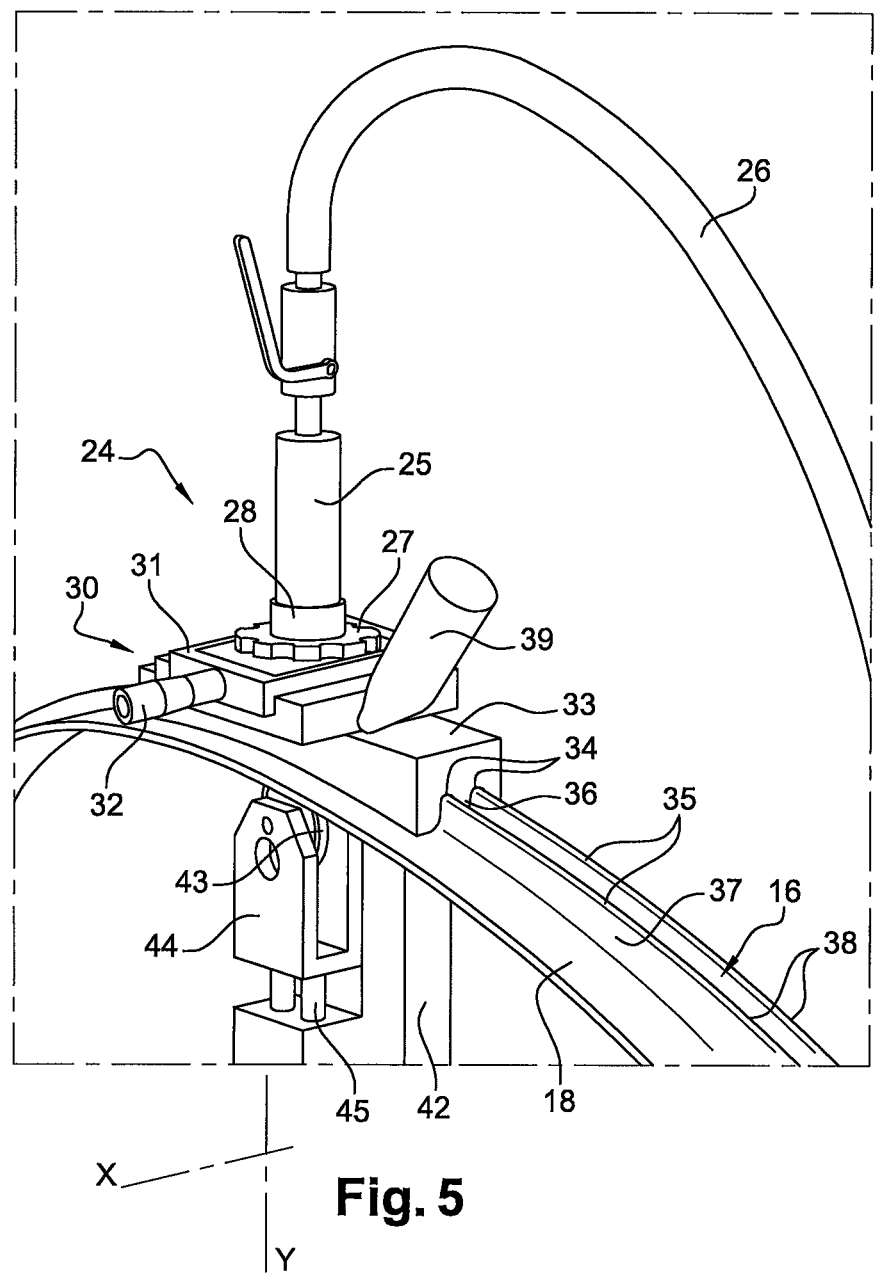
Figure 6:
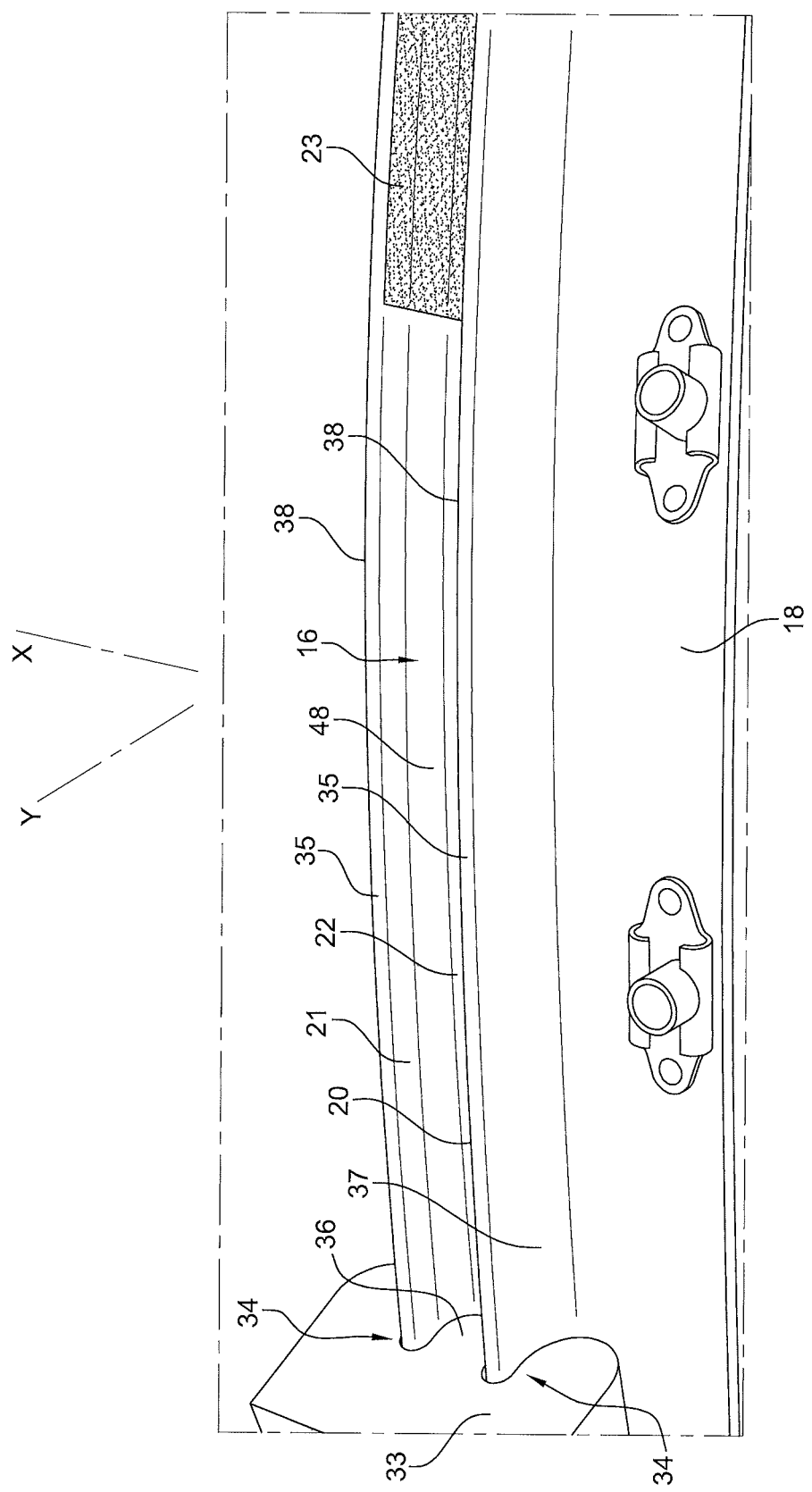

The invention will be better understood and other details, characteristics, and advantages of the invention will appear on reading the following description given by way of non-limiting example and with reference to the accompanying drawings, in which:

FIG. 1 diagrammatically illustrates a partial axial cross-section of an aircraft turbojet engine, FIG. 2 is a larger-scale detailed view of the turbojet engine illustrated in FIG. 1, showing the link between the casing revolution part and the thrust reverser cowls, FIG. 3 is a perspective view of the tooling according to the invention, FIG. 4 is a front view of the tooling, FIG. 5 is a perspective view of the tooling and of the intermediate casing shroud, wherein the tooling is installed at the groove of the shroud, FIG. 6 is a view illustrating a worn area of the groove that is partially machined, wherein the baseplate of the tooling is installed on the groove.

FIG. 1 shows an aircraft turbojet engine 1 comprising a nacelle 2 and a fan casing 3, extended rearwards by an intermediate casing 4.

The intermediate casing 4 comprises a radially external shroud 5 located in the rearwards aerodynamic extension of the fan casing 3 and crossways flanges 6 arranged radially inwards in relation to said external shroud 5. The intermediate casing 4 furthermore comprises structural arms 7 distributed angularly and extending radially between the flanges 6 to the external shroud 5 with which they come into contact.

The external shroud 5 of the intermediate casing 4 comprises, in its downstream portion, a revolution part 8, the main purpose of which is to establish a link between the external shroud 5 and the nacelle cowls directly adjacent in the downstream direction.

The nacelle 2 forms a continuous aerodynamic external surface, constituted by an air intake 9, fan cowls 10, thrust reverser cowls 11 and a fixed rear casing 12, wherein these components are arranged adjacent to each other from the front towards the rear.

The thrust reverser cowls 11, generally two in number and hingedly connected to the rigid structure of the pylon, delimit in a known fashion an annular channel of secondary flow 13, by means of annular skins, external 14 and internal 15.

As can be seen in greater detail in FIG. 2, the link between the revolution part 8 of the casing and the thrust reverser cowls 11 is established by means of an annular groove 16 created in the revolution part 8 and an annular lip 17 which is mounted on a supporting structure 18 bearing the cowls 11, which is received in the groove 16.

This interaction between the annular lip 17 and the groove 16 provides the axial and radial hold of the reverser cowls 11 on the nacelle 2.

A annular seal 19 is arranged between the groove 16 and the lip 17 to prevent any air circulation at the junction between the revolution part 8 and the supporting structure 18.

The axial section of the groove 16 is globally U-shaped and the groove 16 thus comprises a revolution front surface 20, a revolution rear surface 21 opposite the front surface 20 and a cylindrical bottom surface 22 connecting the front and rear surfaces 20, 21 at their internal radial ends.

The annular lip 17 is received in the groove 16 and rests axially and/or radially against the surfaces 20, 21, 22 of the groove 16.

During operation of the turbojet engine 1, the vibrations generated by the moving parts cause movement of the lip 17 in the groove 16 and therefore gradual wear of the surfaces 20, 21, 22 of the groove 16.

In order to limit the overall weight of the turbojet engine, the revolution part 8 is made of aluminium-based material, which wears out quickly.

If wear of the surfaces 20, 21, 22 of the groove 16 is excessive, a wide clearance develops between the lip 17 and the groove 16.

In order to be able to repair said surfaces 20, 21, 22, it is first of all necessary to machine the worn areas 23 (FIG. 6) of these surfaces 20, 21, 22 before affixing an anti-wear strip for example on each machined area, with an anti-wear strip of this kind being produced for example based on resin and comprising fibres. Another solution involves for example applying to each machined area a layer of resin in addition to a solution for lubricating the repaired area.

In order to perform machining of the different areas used directly under the wing of an aircraft, i.e. without removal and/or complete dismantling of the engine 1, the invention proposes tooling 24 illustrated in FIGS. 3 to 6.

The latter comprises a machining tool 25 provided in the form of a milling machine, the bur of which rotates around a radial axis Y, perpendicular to the longitudinal axis X of the turbine engine 1. Said milling machine 25 is for example of pneumatic type and is connected to a compressed air supply line 26 (FIG. 5).

The radially internal end of the fixed part of said machining tool 25 is fixed to a ring-shaped plate 27, via a micrometric ring 28. The bur of the machining tool 25 is therefore radially mobile, to a certain extent, in relation to the plate 27. Pivoting of the ring 28 around the axis Y allows adjustment of the position of the bur of the machining tool 25.

The radial position of the bur can be adjusted with a tolerance of less than 0.05 mm, preferably less than 0.025 mm.

The plate 27 is fixed to a support 29 of a micrometric table 30. The latter furthermore comprises a frame 31, with the support 29 being mobile along the axis X in relation to the frame 31. Movement of the mobile support 29 is actuated by a micrometric screw 32. The axial position of the support 29 and therefore of the bur, can be adjusted with a tolerance of less than 0.1 mm, preferably less than 0.05 mm.

The frame 31 is fixed to the radially external surface of a baseplate 33. Said baseplate 33 furthermore comprises two grooves 34 (FIGS. 5 and 6) extending circumferentially, i.e. perpendicularly to the axes X and Y and emerging radially inwards. Said grooves 34 are of shapes that match the sides 35 delimiting the groove 16 of the shroud 5 of the intermediate casing 4 and mutually delimit a protruding portion 36 designed to be engaged in the groove 16 of the shroud 5.

More particularly, the surfaces of said grooves 34 are designed to rest on the surfaces 37 of the sides 35 opposite the surfaces 20, 21 delimiting the groove 16 and/or on the radially external ends 38 of the sides 35.

Said baseplate 33 is also equipped with a hollow handle 39, serving to aspirate the chips generated during machining, connected to a suction line not illustrated. The baseplate 33 is also equipped with blowing means 40 (FIG. 3) arranged opposite the suction means 39, so as to channel the chips towards said suction means 39. The blowing means 40 comprise a blowing nozzle connected in 41 to an auxiliary compressed air supply line (not illustrated).

The tooling 24 furthermore comprises a base 42 extending radially, fixed to the baseplate 33, wherein a roller 43 is mounted on said base 42, opposite the baseplate 33, wherein said roller 43 is mounted on a yoke 44, fixed itself to the end of one or several mobile rods 45, wherein said rods 45 and the roller 43 are returned radially outwards, i.e. in the direction of the baseplate 33, via elastic return means comprising a helical compression spring 46.

The procedure below is adopted to machine one or several worn areas 23, i.e. one or several angular sectors of the groove 16 of the shroud 5 of the intermediate casing 4.

First of all, after opening the thrust reverser cowls 11 of the nacelle 2, the operator mounts the tooling 24 on the shroud 5. In particular, the protruding portion 36 of the baseplate 33 is engaged in the groove 16 of the shroud 5 and the sides 35 are engaged in the grooves 34 of the baseplate 33.

The roller 43 is applied, by means of the spring 46, to the radially internal surface of the shroud 5, opposite the grooving 16. The radially external ends 38 of the sides 35 are then able to rest on the bottoms of the grooves 34 of the baseplate 33, thereby immobilising the latter radially in relation to the shroud 5. Furthermore, the surfaces of the grooves 34 of the baseplate 33 rest against the surfaces 37 of the sides 35, such that the baseplate 33 is likewise immobilised axially in relation to the shroud. Depending on the shape of the surfaces 37 (for example, fillet-shaped or frustoconical), radial and axial positioning can be achieved merely by the surfaces of the grooves 34 resting on the surfaces 37 of the shroud 5, wherein the ends 38 of the sides 35 do not in this case bear against the bottom of the grooves 34.

In order to precisely adjust the radial position of the bur in relation to a non-worn and accessible reference of the shroud 5, for example the area referenced 47 in FIG. 2, the operator rotates the micrometric ring 28. Furthermore, in order to precisely adjust the axial position of the bur in relation to said reference 47 of the shroud 5, the operator turns the micrometric screw 32 of the micrometric table 30 so as to move the support 29.

To this end, the operator can measure the wear of the worn part using a comparator-type tool. For this purpose, if the groove is excessively damaged, the latter is reconstructed, at least in part, using additional metallic components and the thickness of a sound part of the groove is subsequently used as a reference for the comparator. In other words, the comparator is positioned, in order to be tared, on a sound part of the groove. The comparator is subsequently mounted on a used portion of the groove to determine the difference in thickness between the sound portion and the worn portion of the groove. The position of the bur is then adapted accordingly.

The milling tool 25 can subsequently be started and the tooling 24 can be moved circumferentially, using the handle 39, along the worn area 23 of the groove 16 of the shroud 5, so that the bur is able to machine the worn areas of the surfaces 20, 21, 22.

FIG. 6 illustrates a worn area 23 of the groove that has been partially machined. The part already machined is referenced 48 on this figure.

The invention thus proposes tooling 24 and a machining method allowing machining of only the worn areas 23 of the groove 16 of the shroud 5, directly under the aircraft wing.

The invention claimed is:

1. A tooling for machining an annular groove of an annular casing of a turbine engine, said tooling comprising:
   a machining tool;
   a baseplate;
   a first means of positioning the machining tool in relation to the baseplate along a first axis forming a radial axis;
   a second means of positioning the machining tool in relation to the baseplate along a second axis perpendicular to the first axis, wherein said second axis extends along an axis of the annular groove and of the annular casing;
   a third means of positioning for positioning the baseplate axially and radially in relation to the annular groove of the annular casing, wherein said third means of positioning includes:
      at least one bearing area of the baseplate for at least one of engaging and resting radially and axially in a form-fitting manner on radial sides delimiting the annular groove of the annular casing of the turbine engine; and
   a pressure means for holding the baseplate against the annular casing.

2. The tooling according to claim 1, wherein the first means of positioning comprises a micrometric ring for adapting the position of the machining tool along the first axis, by rotating the micrometric ring.

3. The tooling according to claim 2, wherein the second means of positioning comprises a micrometric table having a mobile support that is mobile along the second axis in relation to the baseplate, wherein the machining tool is mounted on the mobile support.

4. The tooling according to claim 3, wherein the machining tool is mounted on the mobile support via the first means of positioning.

5. The tooling according to claim 1, wherein the machining tool is a milling tool.

6. The tooling according to claim 1, wherein the first means of positioning positions the machining tool radially in relation to the baseplate with a tolerance of less than 0.05 mm.

7. The tooling according to claim 1, wherein the pressure means comprises at least one roller and an elastic return means for holding said roller on the annular casing, opposite said annular groove and the baseplate.

8. A method of machining an annular groove of an annular casing of a turbine engine, comprising:
   identifying a worn area of an annular groove,
   installing the tooling according to claim 1 on said annular casing such that the baseplate is mounted on said annular groove via the third means of positioning, at a level of said worn area and such that the pressure means holds the baseplate against the annular casing,
   machining at least part of said worn area of the annular groove by moving the tooling along said worn area.

9. The method according to claim 8, wherein the step of installing the tooling on the annular casing comprises a step of radial and axial positioning of the machining tool in relation to said annular groove, using the first, second, and third means of positioning.

10. The tooling according to claim 1, wherein the first means of positioning positions the machining tool radially in relation to the baseplate with a tolerance of less than 0.025 mm.

11. The tooling according to claim 1, wherein the second means of positioning positions the machining tool axially in relation to the baseplate with a tolerance of less than 0.1 mm.

12. The tooling according to claim 1, wherein the second means of positioning positions the machining tool axially in relation to the baseplate with a tolerance of less than 0.05 mm.

* * * * *